April 22, 1947.       R. GROETCHEN       2,419,261
COOKER
Filed June 3, 1944         4 Sheets-Sheet 1

INVENTOR.
Richard Groetchen
BY Clarence E. Threedy
His Attorney

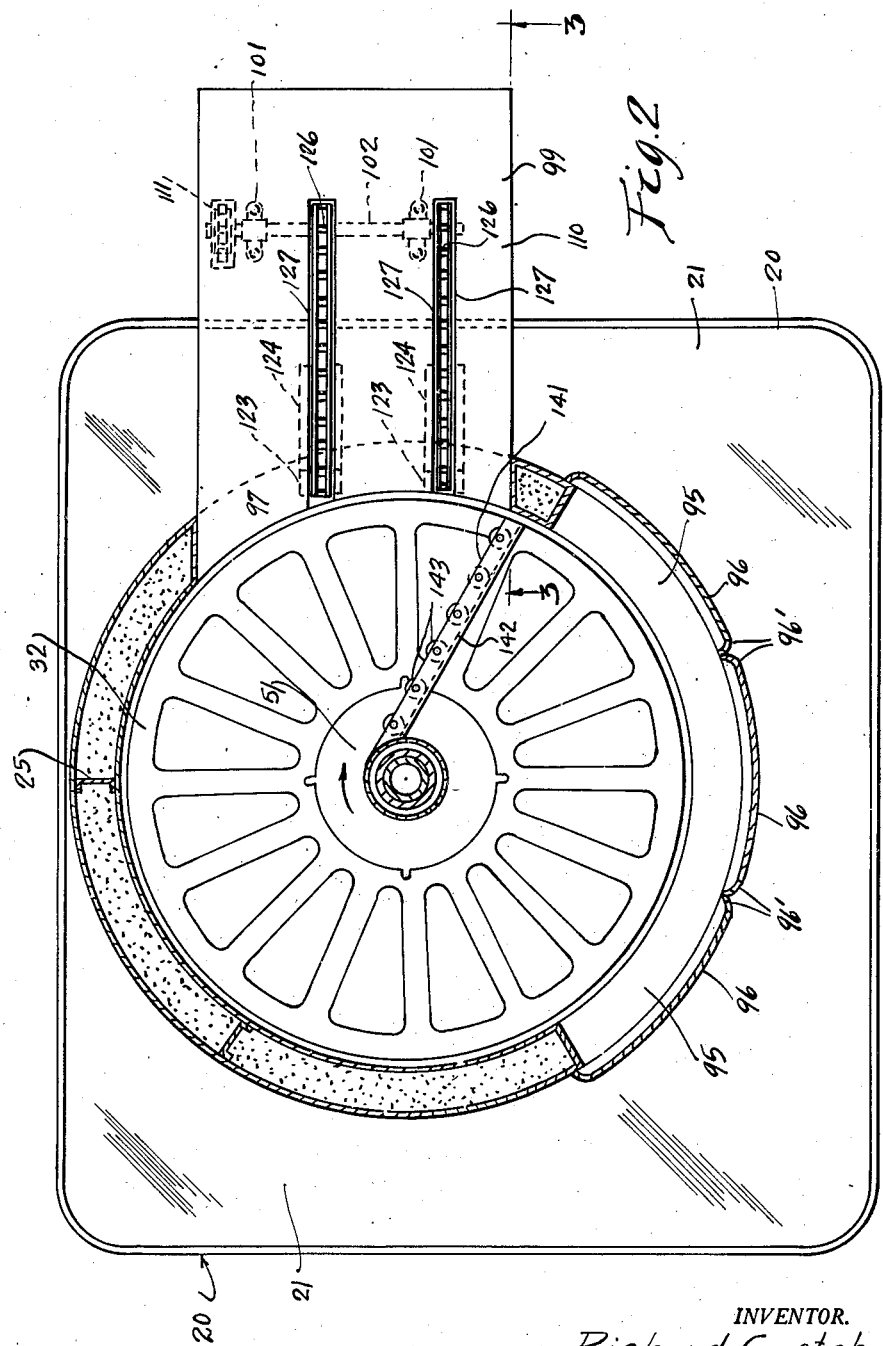

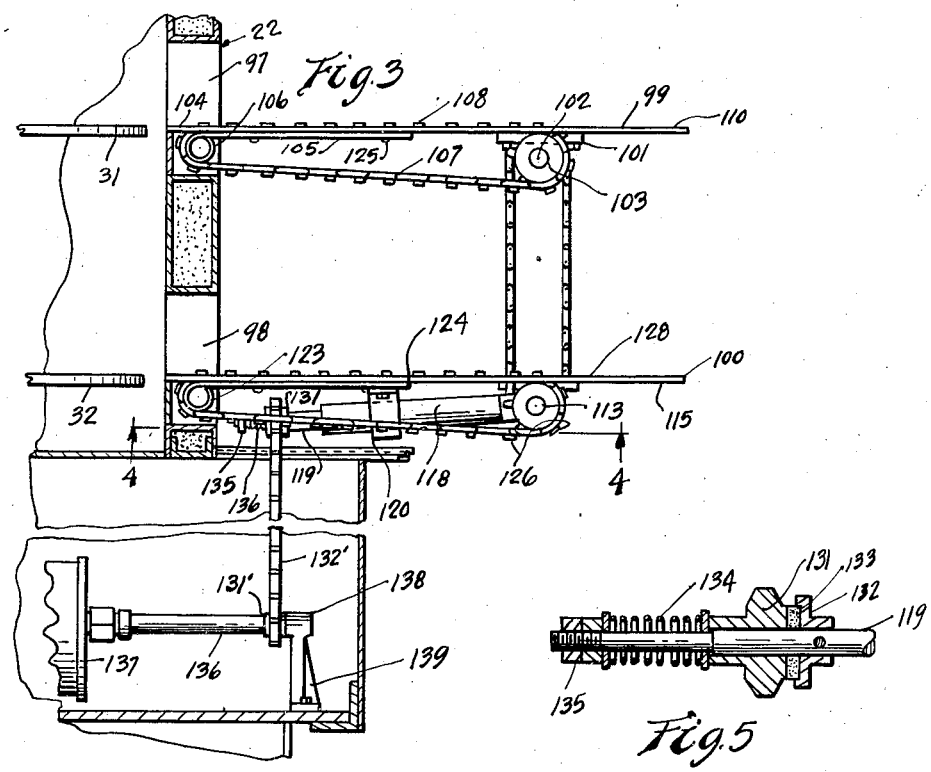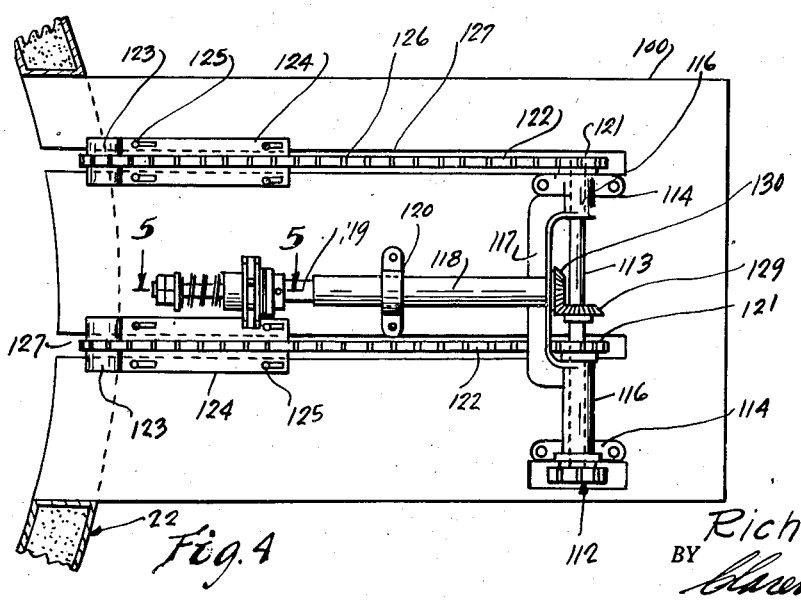

April 22, 1947. R. GROETCHEN 2,419,261
COOKER
Filed June 3, 1944 4 Sheets-Sheet 4
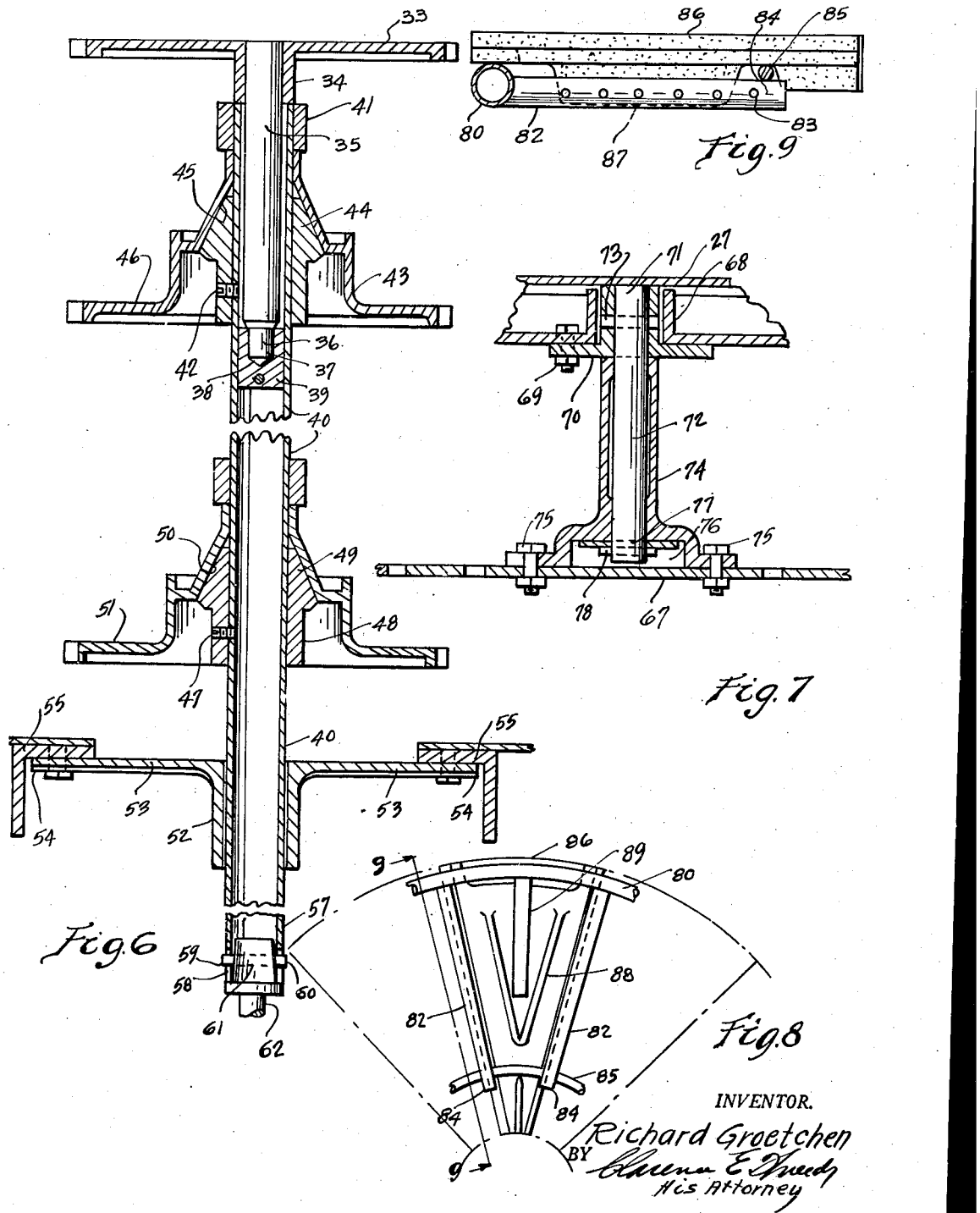

Patented Apr. 22, 1947

2,419,261

UNITED STATES PATENT OFFICE 2,419,261

COOKER

Richard Groetchen, Chicago, Ill.

Application June 3, 1944, Serial No. 538,613

3 Claims. (Cl. 99—423)

This invention relates to certain new and useful improvements in cookers and has for its principal object the provision of an improved construction of this character which will be highly efficient in use and economical in manufacture.

Among the salient objects of this invention is the provision of a cooker having an enclosure divided into a plurality of compartments by grid plates, certain of which are supported within the enclosure for manual rotation while the remaining grid plates are mechanically rotated during the process of broiling or cooking and at a speed of rotation which will be most effective for the purpose.

By thus dividing the enclosure into a plurality of chambers, one chamber may be used for warming purposes, that is, to maintain the food warm after having passed through the broiler or cooking chamber.

A still further and equally important object of the invention is to provide in connection with a rotatable grid plate upon which food is supported during the cooking or broiling operation, a simple and effective arrangement for automatically removing the pan containing the food from the grid plate at a predetermined time when the food has been cooked or broiled to the desired point, which is determined by the speed of rotation of the grid plate supporting the food, or by repassing the food through the cooking chamber. The advantage of such an arrangement, as will be more fully understood from the description hereinafter set forth, is found in the fact that the operator of the cooker, after having placed the food upon the grid plate, need pay no attention to the cooking operation until the food has been removed by the automatic means from the grid plate, from which plate the food is conveyed upon a platform, from whence it is taken by the operator to a place to be served to the consumer.

Yet a further object of the invention is the provision of circulating air to the burner elements of the cooker whereby there is always maintained during the cooking operation a continuous wave of warm air, thus facilitating the cooking operation with the highest degree of results within a minimum of time.

A still further object of the invention is the provision of a cooker having a construction which facilitates convenient operation thereof as well as the placement of food within the cooker either for warming purposes or for cooking or broiling operation, requiring but a minimum of attention thereto by the operator.

A still further and equally important object of the invention is the provision of a burner structure within the cooker, which comprises an arrangement of ceramic plates so arranged with respect to each other as to occupy the minimum of space and yet radiate the necessary and desirable heat to bring about the most efficient cooking results.

Another object of the invention is the provision of abutting door members, through the openings of which, access is had to the cooking chambers, the doors being so arranged that when open there is but one single door opening, thus exposing to the operator a substantial view of the grid plates.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a sectional detail view of the same taken substantially on line 2—2 of Fig. 1;

Fig. 3 is a side elevational view taken substantially on line 3—3 of Fig. 2;

Fig. 4 is an under plan view taken substantially on line 4—4 of Fig. 3;

Fig. 5 is a fragmentary sectional detail view taken substantially on line 5—5 of Fig. 4;

Fig. 6 is a sectional detail view taken substantially on line 6—6 of Fig. 1;

Fig. 7 is a sectional detail view taken substantially on line 7—7 of Fig. 1;

Fig. 8 is a fragmentary plan view of the bottom side of one of the burner structures embodied in the invention; and Fig. 9 is a sectional detail view taken substantially on line 9—9 of Fig. 8.

Figure 1:
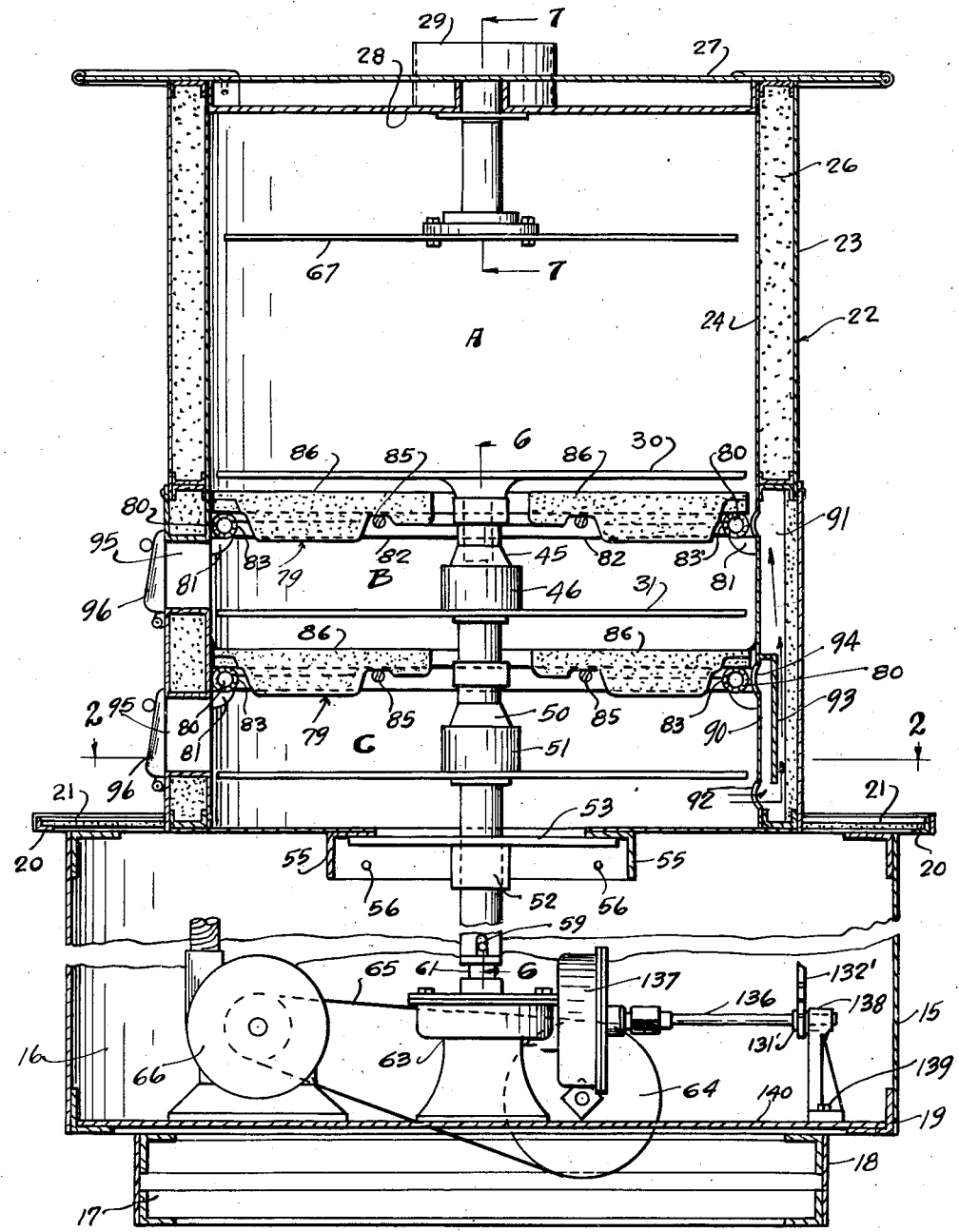
Fig. 1 is a vertical sectional detail view of the cooker embodying my invention.

The drawings illustrate the preferred form of construction by which the several objects of the invention are accomplished. In this connection, my improved cooker comprises a base structure 15 of any approved type or construction comprising a compartment 16 within which certain operating mechanism of the cooker are housed. This base structure may include a base plate 17 preferably having its side walls 18 set inwardly from the side walls 19 of the base structure 15 for ornamental or other purposes. The top of the base structure 15 comprises a work table 20 likewise of any approved structure as will best serve the purpose, including a table portion 21 of such material as will not be scorched or burned by hot plates and which is non-absorbent for sanitary purposes. Extending upwardly from this base 15 is an enclosure 22 preferably comprising an outer wall 23 and an inner wall 24 spaced from each other by suitable spacing studs 25 (Fig. 2). The space between these walls 23 and 24 is firmly packed with an insulating material 26 to prevent permutation or escape of heat from within the enclosure 22.

The enclosure 22 comprises a top wall 27 and this top wall 27 provides a fuel opening 28 communicating with a fuel pipe 29 to provide a vent for the interior of the cooker. The enclosure 22 is divided into compartments A, B and C by means of grid plates 30, 31 and 32. The grid plate 30 (Fig. 6) is supported by a center disc 33. This disc 33 has a hub 34 and positioned in this hub 34 is a stud shaft 35, the lower end 36 of which is reduced to provide a pilot 37 engaging in a socket 38 formed in a plug 39 fixed to a hollow shaft 40. The hub 34 rests upon a collar 41 surrounding the upper end portion of the shaft 40.

The arrangement is such that the grid plate 30 may be freely and manually rotated about its vertical axis. Fixed to the shaft 40 as at 42 is a hub 43 having a conically shaped head 44 fitting into a conically shaped socket 45 formed in a disc 46 which carries the grid plate 31 in spaced parallel relation to the grid plate 30 and providing, together with the grid plate 30, the cooking chamber B.

Fixed to the shaft 40 as at 47 is a hub 48 also having a conically shaped head 49 engaging in a like shaped socket 50 formed in a disc 51 which supports the grid plate 32 in parallel spaced relation with respect to the grid plate 31 and providing, together with the grid plate 31, broiling chamber C. The shaft 40 extends into the compartment 16 through a bearing sleeve 52. This bearing sleeve 52 is formed as an integral part of the plate 53, the ends 54 of which are connected to supporting angle-like bars 55, the ends of which as at 56 are connected to the opposite walls of the housing 15. The lower end portion 57 of this shaft 40 terminates in a bifurcated portion 58, the bifurcations of which receive the opposite end portions 59 of a connecting pin 60 carried by the head 61 of a driving shaft 62 constituting part of a driving mechanism symbolically illustrated at 63, including a driven pulley 64 operatively connected by means of a belt 65 to a motor 66 or other driving agent.

The arrangement is such that upon operation of the driving shaft 62 the shaft 40 will be rotated and impart rotation to the grid plates 31 and 32 so that food mounted in plates upon these grid plates may be carried through the cooker over suitable burner structures presently to be described. Access to the upper compartment A is brought about through a suitable door opening (not shown) and preferably formed in the side wall of the enclosure 22. Within this compartment A is a supporting plate 67 which may be utilized for containing filled platters or as a plate warmer.

This supporting plate 67 is freely manually rotatable and is mounted in spaced relation with respect to the top wall 27 in the following manner:

Connected to the bar members 68 of the top structure 27 as at 69 is a sleeve 70. Positioned in this sleeve 70 is an end portion 71 of a shaft 72, the end portion 71 being connected to the sleeve by means of a pin 73. The shaft 72 extends through a bearing 74 connected to the supporting plate 67 as at 75. Within a recessed portion 76 provided between the plate 67 and the bearing 74, the end 77 of the shaft 72 extends, and this end portion 77 carries a pin 78 which provides connection between the plate 67 and the shaft 72 in a manner such that the plate may be freely located within the compartment A.

Beneath the grid plates 30 and 31 are arranged burner structures 79. Each of these burner structures comprises a conduit 80 bent to conform to the circular shape of the enclosure 22 and supported adjacent the inner wall 24 thereof by suitable hangers 81. These conduits 80 are connected to a suitable source (not shown) of fuel supply, such for example as combustible gas or the like. Extending radially inwardly from these conduits 80 are stud pipes 82 perforated as at 83, the ends 84 of these pipes carrying a supporting ring 85.

Supported by these rings 85, with the cooperation of the conduits 80, are ceramic plates 86. These plates 86 each have portions 87 disposed between the adjacent burner pipes 84 and against which the flame from the burner pipes 84 is directed for the purpose of readily heating the same to bring about efficient cooking operation. Each of these ceramic plates 86 provides converging ribs 88 between which is positioned a burner pipe 89 of a structure similar to the burner pipe 84. By this arrangement of the ceramic plates, each plate is heated to its fullest capacity in the shortest possible time and serves to radiate the heat uniformly through its entire surface.

To increase the cooking capacity of the cooker and to produce the proper heat for efficient cooking purposes, I prefer to form in the lower portion of the enclosure 22, air passages 90 and 91. Air is admitted to these passages 90 and 91 through the lower openings 92 formed in the inner wall 24 of the enclosure 22. Any number of such openings 92 may be provided. These passages 90 and 91 are separated by an interior partition 93. From these passages 90 and 91, air emits through openings 94 likewise formed in the inner wall 24 adjacent the burner conduits 80.

This arrangement assures a free, rapid, and efficient circulation of air through the cooker, the air being admitted cold and heated during its passage through the cooker.

Access to each of the chambers B and C is provided through a door opening 95 normally closed by doors 96 so arranged with respect to each other as to have their adjacent ends 96' in abutting engagement with each other, whereby when all the doors are in the position shown in Fig. 2, the opening 95 will be completely closed. When such doors are open, the opening 95 is completely unobstructed so that free access may be had to the interior of the compartment B or C. The doors 96 are so pivoted with respect to the enclosure as to permit each door to be independently moved to an open position. By this structure a door opening of maximum size is provided to afford free access to the containers containing the food, upon the grid plates 30 and 31.

These grid plates 30 and 31 rotate in the direction indicated by the arrow (Fig. 2), and the containers or platters carrying the food are automatically ejected from the cooker, preferably by the following described mechanism:

As shown in Figs. 2 and 3, there is provided in the wall of the enclosure 22 two discharge or withdrawal openings 97 and 98, the opening 97 communicating with the chamber B and the opening 98 communicating with the chamber C. Mounted in a plane with each of the grid plates 31 and 32 are shelves 99 and 100. Carried by the shelf 99 are spaced bearing brackets 101 (Fig. 2). These bearing brackets carry a shaft 102. Fixed to this shaft 102 are spaced sprocket wheels 103. Adjustably secured to the underside of the shelf 99 adjacent the inner end 104 thereof is an elongated bar 105 having one end portion rolled to provide a stationary roller 106 over which a sprocket chain 107 is payed. This sprocket chain 107 likewise extends around the sprocket wheel 103. Associated with the shelf 99 are two such sprocket chains 107, and each of these sprocket chains has small projections 108 disposed thereon in spaced relation with respect to each other. These projections 108 project through slots 109 formed in the shelf 99 and project slightly above the top surface 110 of the shelf 99.

Carried by this shaft 102 is another sprocket 111 having connection with a sprocket 112 carried by a shaft 113 mounted in suitable bearing brackets 114 disposed against the under surface 115 of the shelf 100 (Fig. 4). This shaft 113 is journaled through suitable bearing sleeves 116 formed as an integral part of a T-shaped bar 117. The stem 118 of this bar 117 is hollow in construction and journalled therethrough is a shaft 119. The stem 118 is supported from the underside of the table 115 by a bearing bracket 120.

On the shaft 113 are spaced sprockets 121 around which sprockets, sprocket chains 122 are payed. These sprocket chains 122 are payed over stationary rollers 123 formed as an integral part of a bar 124 similar to the bar 105 and adjustably connected to the shelf 100 through slot and pin connections 125 (Fig. 4). These sprocket chains 122, like the sprocket chains 107, carry projections 126 which project up through slots 127 formed in the shelf 100, and these projections protrude slightly above the top surface 128 of the shelf 100.

Fixed on the shaft 113 is a mitre gear 129. This mitre gear meshes with a mitre gear 130 fixed to an end portion of the shaft 119. On the opposite end portion of the shaft 119 there is positioned a sprocket gear 131. A friction drive 132 is fixed to the shaft 119 (Fig. 5) and provides a friction drive between the shaft 119 and the sprocket gear 131. The sprocket gear 131 is yieldably held in contact with the friction disc 133 of the friction drive 132 by means of a spring assembly 134 including retaining nuts 135 (Fig. 5). The sprocket gear 131 (Fig. 3) is operatively connected to a sprocket 131' through the medium of a sprocket chain 132'. This sprocket gear 131' is carried by the driving shaft 136 which is drivingly connected through the medium of a train of gears (not shown) contained within a gear house 137 for simultaneous operation with the shaft 40 upon operation of the motor 66. The outer end portion of shaft 136 is supported in a suitable bearing 138 mounted as at 139 to the floor 140 of the housing 15 (Figs. 1 and 3).

To guide the food containers or platters from the grid plates 31 and 32 onto the shelves 99 and 100, there is provided a guiding or directional structure 141. This structure comprises a suitable bar 142 extending with reference to the grid plates 31 and 32 in the manner shown in Fig. 2. Carried by this bar 142 are spaced rollers 143. The arrangement is such that when the food container or platter contacts with these rollers 143, the container or platter will be directed toward the receiving shelf where it is picked up by the projections of the sprocket chains and carried from within the cooker to a position upon the shelf, where it can be readily removed by the chef. Should for any reason the mechanism for automatically withdrawing or ejecting the food container or platter from within the cooker, become jammed or otherwise rendered inoperative, the motor driving the gear train within the housing 137 and in turn the shaft 136 will continue to operate, but the sprocket 131 will rotate freely upon the shaft 119 without operating the latter shaft until the jammed mechanism, or that which is causing the inoperativeness of the mechanism, is removed and the mechanism again permitted to operate in its normal manner.

In most cookers with which I am familiar, the mechanism for operating the cooker requires such attendance of the chef as diverts his attention from the cooking process and as a result the food passing through the cooker is not given its proper attention. From the foregoing description, taken in connection with the accompanying drawings, it will be obvious that the chef or operator of the cooker need not apply his attention to any part of the mechanical operating parts of the cooker, but may devote his entire attention to the process of cooking the food. As a result the food when withdrawn from the cooker is cooked to a proper condition and possesses appealing taste to the consumer. In general, cookers with which I am familiar are complicated in construction and require considerable attention. The cooker embodying my invention contains mechanism of the simplest nature, mechanism that will not easily become out of order, and as a result requires very little, if any, attention from the chef.

A cooker constructed in accordance with the description herein disclosed, may be constructed at an economical cost and, as I have found by actual practical use, it will be highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A cooker comprising an enclosure, grid plates dividing said enclosure into compartments, burner elements contiguous of said grid plates, means for rotatably supporting said grid plates, shelf members carried by said enclosure on the exterior side thereof, there being an opening in said enclosure permitting the passage of containers from the grid plates to said shelf members, means comprising spaced roller elements for guiding containers from the grid plates in a direction toward said shelf members, conveyor means carried by the shelf members and adapted to receive the containers as guided from said grid plates, means for rotating the grid plates, and means for rotating said conveyor means.

2. A cooker comprising an enclosure, grid plates dividing said enclosure into compartments, burner elements contiguous of said grid plates, means for rotatably supporting said grid plates, shelf members carried by said enclosure on the exterior side thereof, there being an opening in said enclosure permitting the passage of containers from the grid plates to said shelf members, means comprising spaced roller elements for guiding containers from the grid plates in a direction toward shelf members, conveyor means carried by the shelf members and adapted to receive the containers as guided from said grid plates, means common to the grid plates and conveyor means for rotating said grid plates and conveyor means.

3. A cooker comprising an enclosure, a rotatable grid plate in said enclosure, a burner structure contiguous said grid plate, means for supporting said burner structure in position contiguous said grid plate, means for rotating said grid plate, a shelf member exterior of said enclosure and in substantially the same plane with respect to the grid plate and adapted to receive a container from said grid plate, there being an opening in said enclosure permitting passage of said container from said grid plate to said shelf member, and means cooperating with said grid plate for moving said container from said grid plate through said opening onto said shelf member, said last-named means comprising roller elements adapted to engage said container and guide said container from said grid plate onto said shelf member, and sprocket chains arranged in pairs and supported by said shelf member and provided with projections protruding through slots in said shelf member to engage said container as said container is moved by said roller elements onto said shelf member from said grid plate.

RICHARD GROETCHEN.

REFERENCES CITED

The following references are of record in the file of this patent:

UNITED STATES PATENTS

| Number | Name | Date |
| --- | --- | --- |
| 814,540 | Higbee | Mar. 6, 1906 |
| 1,719,713 | Miller | July 2, 1929 |
| 2,040,016 | Sanders | May 5, 1936 |
| 2,099,788 | Ames | Nov. 23, 1937 |
| 1,631,655 | Sunderland et al. | June 7, 1927 |
| 2,372,362 | Dawson | Mar. 27, 1945 |
| 1,599,556 | Cook | Sept. 14, 1926 |
| 1,393,288 | Hutton | Oct. 11, 1921 |
| Re. 19,685 | Brand | Sept. 3, 1935 |
| 1,731,743 | Harrison | Oct. 15, 1929 |
| 1,543,212 | Kurrell et al. | June 23, 1925 |
| 600,373 | Newell | Mar. 8, 1898 |